United States Patent

[11] 3,540,758

| [72] | Inventor | Jorge Torres |
| | | Newbury Park, California |
| [21] | Appl. No. | 714,593 |
| [22] | Filed | March 20, 1968 |
| [45] | Patented | Nov. 17, 1970 |
| [73] | Assignee | Purolator Inc. |
| | | Rahway, New Jersey |
| | | a corporation of Delaware |

[54] FLEXIBLE COUPLING FOR DUCTS
22 Claims, 8 Drawing Figs.

[52] U.S. Cl. ................................................ 285/233,
285/261, 285/381; 24/279
[51] Int. Cl. ...................................................... F16l 21/00,
F16l 27/04
[50] Field of Search .......................................... 285/233,
234, 261, 166, 381, 344.4(Cur)

[56] References Cited
UNITED STATES PATENTS

| 2,713,503 | 7/1955 | Ekholm ........................ | 285/166 |
| 2,793,883 | 5/1957 | Main ............................. | 285/263X |
| 2,918,315 | 12/1959 | Peter et al. .................... | 285/381X |
| 3,154,328 | 10/1964 | Masse ........................... | 285/233 |
| 3,198,559 | 8/1965 | Snyder .......................... | 285/233 |
| 3,287,034 | 11/1966 | Bragg ............................ | 285/381X |
| 2,956,820 | 10/1960 | DeCenzo ....................... | 285/233X |
| 2,967,723 | 1/1961 | Willis ............................ | 285/233 |
| 3,031,213 | 4/1962 | Bruning et al. ................ | 285/233 |
| 3,273,917 | 9/1966 | Chakroff ....................... | 285/334.4 |
| 3,405,957 | 10/1968 | Chakroff ....................... | 285/233 |

FOREIGN PATENTS

| 881,504 | 1/1943 | France .......................... | 285/166 |

Primary Examiner—Thomas F. Callaghan
Attorney—Smyth, Roston and Pavitt

ABSTRACT: A flexible coupling for interconnecting adjacent duct sections. The coupling includes bearing means mounted on each of the duct sections and a retainer engageable with the bearings and spanning the space therebetween to hold the two duct sections together. The coupling is made airtight by sealing means which engage a freely floating sleeve within the retainer.

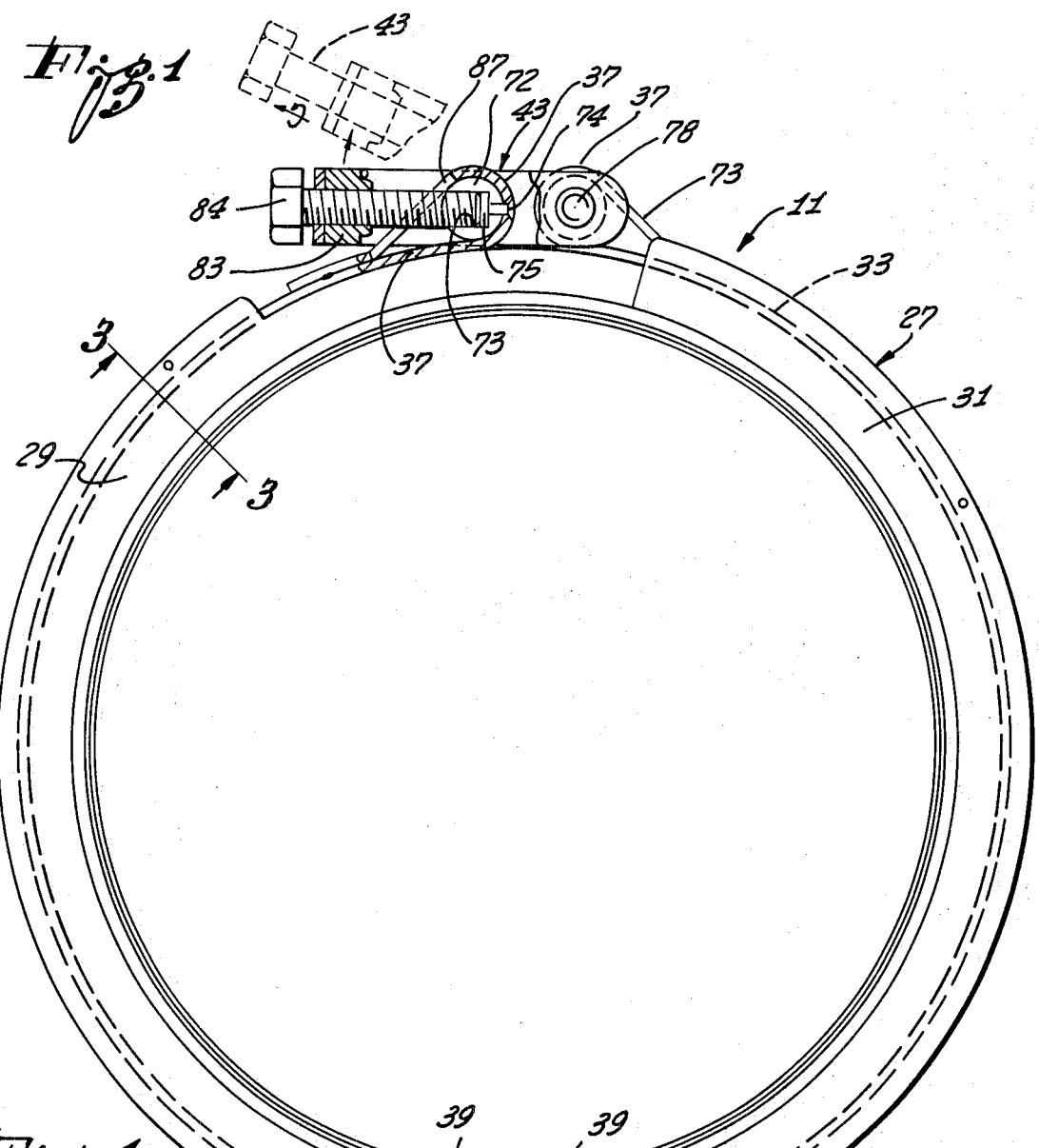
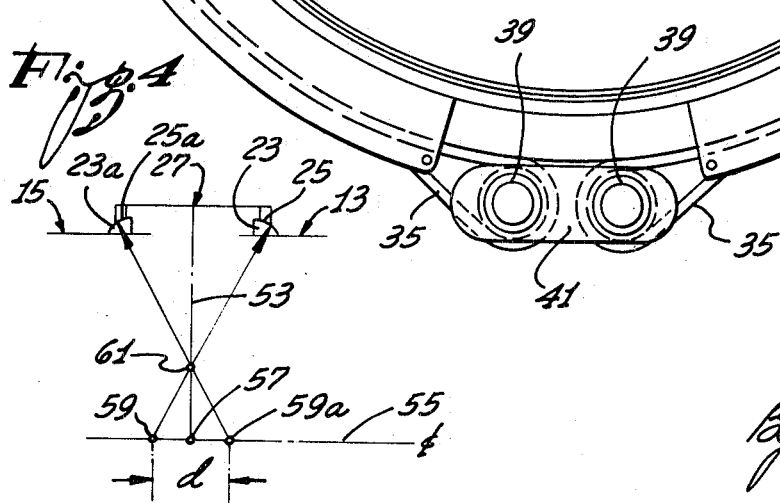
INVENTOR:
Jorge Torres
ATTORNEYS

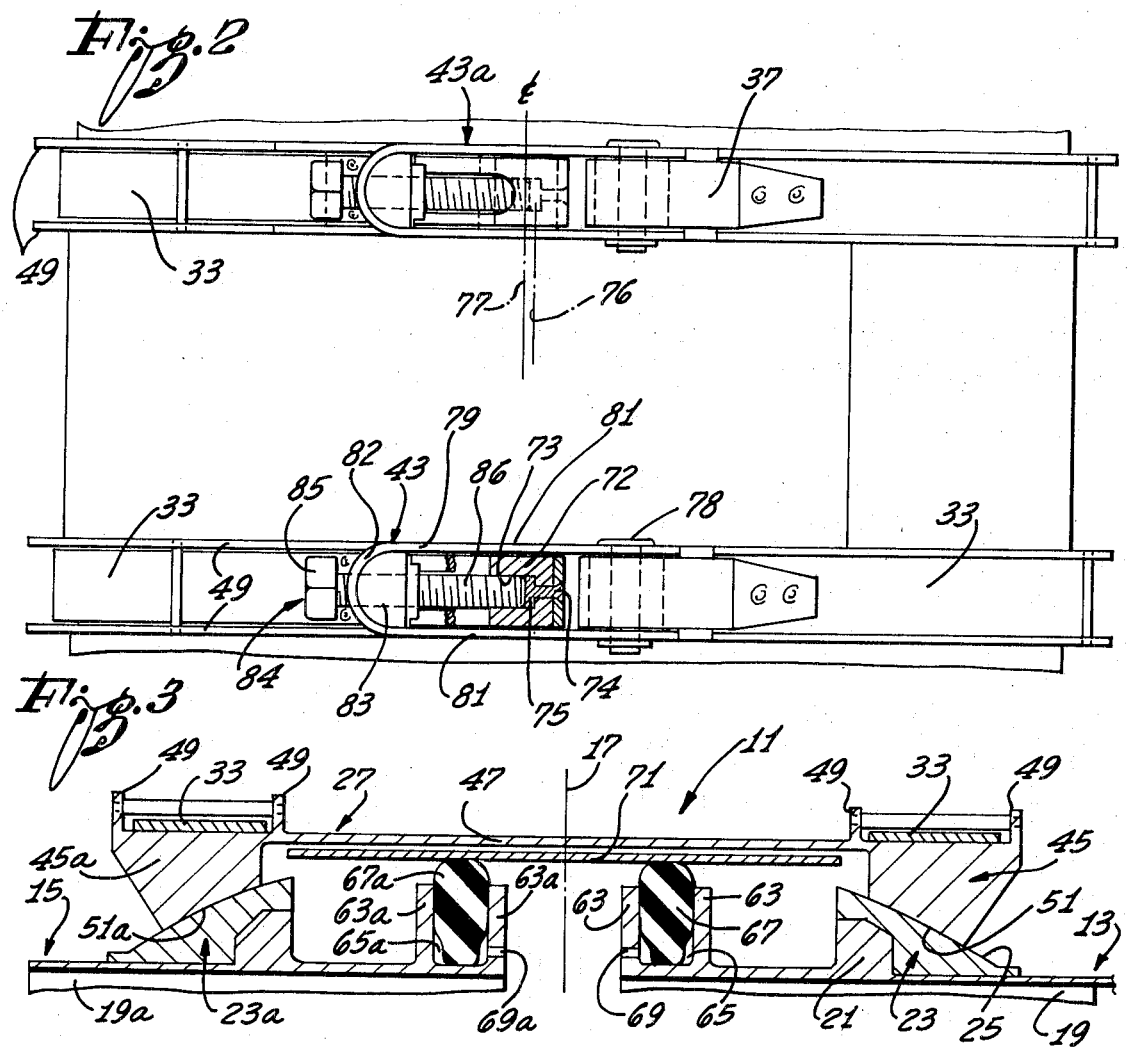
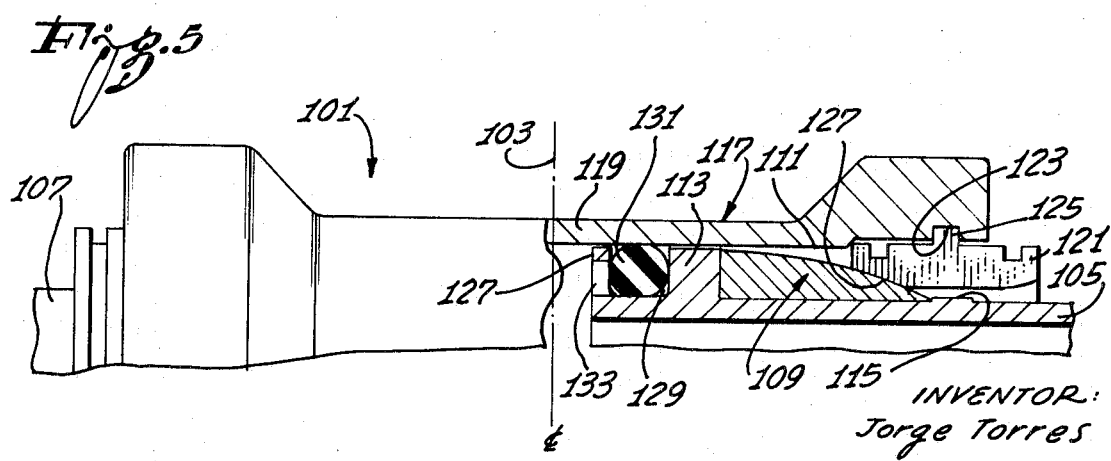

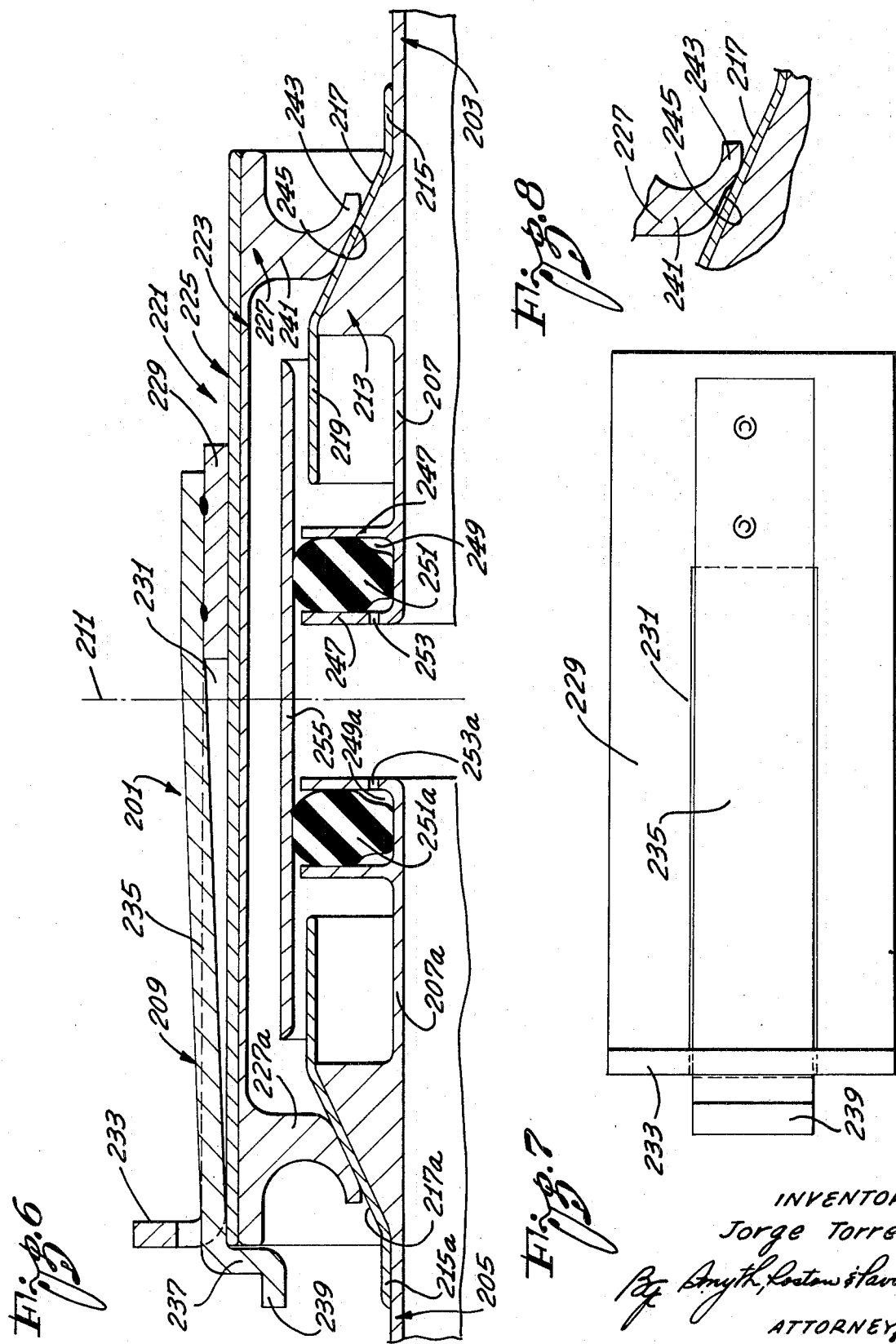

FLEXIBLE COUPLING FOR DUCTS

BACKGROUND OF THE INVENTION

Large modern aircraft have ducts for carrying air under pressure to pressurize the cabin. The ducts are provided in relatively long, individual sections which must be suitably interconnected. Due to flexing of the aircraft in flight, the air pressure within the ducts and dimensional variations brought about by temperature fluctuations, a flexible coupling must be used to join adjacent duct sections.

One prior art type flexible duct coupling includes bearings mounted on the adjacent duct sections with a retainer surrounding the bearings and holding the duct sections together. The bearings and retainer are configured so that when one duct section moves relative to the other, the retainer engages the bearing over a relatively small area thereof to thereby concentrate the stress on the bearing. This causes the bearing to wear rapidly and may even cause separation of the duct sections.

To prevent concentration of the stress, it is desirable to use a ball joint type of flexible coupling. However, ball joints usually are quite large to withstand the loads imposed thereon. In particular, the bearing members are axially short and tend to fail due to twisting loads applied thereto. This is particularly true where the duct diameter is relatively large. Of course, the need for a larger bearing member increases the size of the retainer and the other parts of the coupling. The increased size of the coupling is undesirable in aircraft applications because of the added weight penalty and because of the relatively large space required.

Flexible duct couplings must permit a predetermined amount of relative pivotal movement or angular misalignment between adjacent duct sections. For example, the required amount of pivotal movement may be 4°. Conventional couplings of this type are generally capable of accomodating this amount of pivotal movement if the duct sections are assembled in near perfect axial alignment. However, to the extent that the duct sections are axially misaligned during assembly, the amount of pivotal movement permitted by the coupling is reduced. Thus, unless extreme care is taken during assembly, the conventional coupling may not permit the required amount of pivotal movement.

Another problem with ball joints is that the coupling containing them must be relatively long in order that the spherical ball joint surfaces will have the appropriate slope to prevent "wedging" of the joint. The increased length of the coupling further increases the weight of the coupling.

Because of the relative movement between the duct sections, sealing of the ducts at the joint is a difficult problem. Typically an annular seal surrounds the duct at the joint and sealingly engages the inner surface of the retainer. The seal is provided in a groove or channel and the walls of the channel must terminate radially inwardly from the inner surface of the retainer to avoid interference, i.e., harmful contact with the retainer when relative movement between the duct sections occurs. This substantial gap between the channel and retainer is spanned by the seal and, as the seal is subjected to air under pressure, the seal tends to extrude into the gap to thereby allow leakage through the coupling.

SUMMARY OF THE INVENTION

The present invention provides a flexible coupling for duct sections which permits use of a ball-type joint which is smaller and lighter than the prior art couplings of this type. In addition, the amount of spherical movement which the coupling allows to occur is not made significantly dependent upon the precise axial alignment of the duct sections during assembly. The present invention also provides a novel sealing arrangement for the coupling in which interference among the various parts of the coupling is avoided.

The present invention teaches that by locating the centers of the spheres of the spherical bearing members at axially spaced points, that the coupling can be made shorter and therefore lighter than was possible heretofore. In addition, if the centers of the spheres are axially spaced, the centerlines of the duct sections can be initially radially misaligned without lessening the amount of relative pivotal movement which is permitted by the coupling.

It has been proposed to place the centers of the spherical bearing members at the same point. Such point is located at the midpoint of the coupling and along the centerlines of the two-duct sections. With this construction, the two bearing members had to be spaced axially from each other a significant amount in order that the spherical bearing surface thereof would be sloped sufficiently to avoid wedging with the retainer. With the present invention, the centers of the spheres preferably lie on opposite sides of a transversely or radially extending plane through the center of the coupling and with the transverse plane lying intermediate each of the centers and its respective bearing surface. With this arrangement, the bearing members can be moved closer together axially and yet the appropriate slope of the bearing surface can be maintained to avoid wedging with the retainer.

With the centers of the bearing surfaces spaced in this manner, a predetermined amount of initial radial misalignment brought about by assembly of the duct sections can be tolerated without effecting the ability of the coupling to permit a predetermined amount of angular misalignment. This can be expressed mathematically and calculated before assembly of the duct sections.

The present invention teaches that the weight of the coupling can be further reduced by shrinking the bearing member over the ducts so as to produce hoop stresses therein. In actual use of the flexible coupling the bearing member is subjected to generally radial compressive forces as a result of pressurization of the duct sections which tends to offset the hoop stresses. Therefore, by using preset hoop stresses to offset the generally radially extending force acting on the bearing member, the bearing member can be made much smaller and lighter than would otherwise be possible. This is particularly useful on larger diameter ducts.

According to the present invention, the bearing members are mounted on the duct sections and are held together by a retainer which has a pair of retainer surfaces for engaging the bearing members, respectively. The retainer may be placed in compression by two bands which extend around the retainer radially outwardly of the retainer surfaces thereof. In actual use of the flexible coupling, the pressurization of the duct sections places them in tension and tends to move them axially apart. This force of pressurization is transmitted to the bearing members as an inwardly directed radial force. Thus, the force of pressurization and the preset hoop stress in the bearing members tend to offset each other and the bearing members may be designed so as to be at approximately zero stress when the system is in use.

Although this arrangement does increase the radial inward force on the duct sections, the duct sections are sufficiently strong to withstand these forces. The duct sections are relatively long and therefore have considerable rigidity against twisting forces of the type to which the coupling is subjected. The bearing members on the other hand are relatively axially short and have lesser resistance to such twisting forces.

Another concept of the present invention which is particularly useful on large diameter ducts or ducts which undergo relatively large relative movement is the use of an intermediate free floating sealing sleeve which engages the seals and spans the gap therebetween. The sleeve is spaced from the walls of the seal channel sufficiently to avoid interference therewith but an insufficient amount to provide adequate space for extrusion of the seal under the pressures encountered in the duct section. The retainer can then be spaced a sufficient distance radially outwardly from the sleeve to avoid contact or interference therewith when the duct sections are undergoing relative movement. Thus, the floating sleeve solves the seal extrusion problem without introducing the likelihood of interference among the flexible coupling parts.

The floating sealing sleeve can be placed much closer to the seal channel than the retainer could be for several reasons. First, the sealing sleeve engages both of the seals and the seals are spaced closer together than are the bearing members. Thus, when one duct section moves relatively to the other through a predetermined angle, the sealing sleeve undergoes less displacement as a result of this angle than would the retainer which must engage the relatively widely spaced bearing members. Secondly the retainer is a relatively rigid metal member and engages the rigid bearings. By way of contrast, the sealing sleeve is preferably relatively thin and can undergo a limited amount of deflection much more easily than could the relatively rigid retainer. The sealing sleeve can be made of thin metal because it is not a structural member whereas the retainer is a primary structural member and must be made quite strong and relatively stable.

Another concept of the present invention is to dynamically load the seals radially outwardly. This can be accomplished by providing an aperture in the wall of the seal channel to provide communication between the high pressure air in the duct and an inner annular region of the seal. The dynamic loading of the seal assures that the seal will be continuously urged radially outwardly into contact with the sealing sleeve. In addition, if th seal is pressure loaded outwardly, the seal need not be initially radially compressed as is ordinarily required in conventional O-ring seals. Thus with the present invention, it is only necessary that the outer periphery of the seal initially engage the sealing sleeve and the inner periphery of the seal need not be tightly bottomed in the groove or channel which retains the seal. This increases the useful life of the seal.

When the floating sealing sleeve is used, it preferably extends axially beyond each of the seals. Thus, when the coupling is in use, there is a danger that the flexing movement of the duct sections will cause point contact between the floating sealing sleeve and the edge of the bearing. To prevent concentration of stress should contact between the sleeve and bearing occur, the present invention provides for a cylindrical bearing surface adjacent the spherical bearing surface and positioned so as to engage the sleeve during certain movements of the duct sections. With this arrangement, point contact between the edge of the bearing member and the floating sealing sleeve is eliminated.

Another problem with ball joints is that it is very difficult to precisely fabricate mating convex and concave spherical surfaces. In actual use of the ball joint, the two spherical surfaces are quite rigid and may contact only over a relatively small area thereof and as the joint continues to be used, the rigid contacting portions wear very rapidly to thereby shorten the life of the coupling.

The present invention increases coupling life by utilizing relatively resilient retainer portions. In use of the coupling, the forces acting on the retainer tend to deform the resilient retainer portions into a configuration which mates very well with the associated bearing surface. preferably the retainer portion has first and second integral segments configured so that the first segment and its bearing surface will be in more substantial contact than the second segment and its bearing surface under no-load conditions. Under load the first segment is deformed to permit both of the segments to contact the bearing surface. This significantly reduces wear on these surfaces and extends the useful life of the coupling.

In one form of the present invention, the retainer is provided in two half sections which are held together by a pair of bands which encircle the retainer. Such band should be as narrow as possible to reduce the weight of the coupling and so that the force applied thereby to the retainer will be applied as close to the edge of the retainer as possible. Of the many band-type fasteners now in use, none were found suitable for this type of service in that they were subject to fatigue and deformation.

The present invention provides a band-type fastener which is particularly adapted for use with the couplings disclosed herein. The fastener overcomes the above-noted disadvantages and permits the use of a narrow band. The fastener includes a receptacle secured to one end of the band and having a recess therein opening away from the other end of the band. A U-shaped member pivotally attaches a nut to the other end of the band and a bolt projects through the nut and into the recess. By turning the bolt, it eventually bottoms against the bottom of the recess to circumferentially tighten the band. The U-shaped member maintains the end portions of the band in alignment.

The invention, both as to its organization and method of operation together with further features and advantages thereof may best be understood by reference to the following description taken in connection with the accompanying illustrative drawings.

BRIEF DESCRIPTION OF THE DRAWINGS

FIG. 1 is an end elevational view partially in section of one form of coupling constructed in accordance with the teachings of this invention.

FIG. 2 is a top plan view partially in section of the coupling;

FIG. 3 is an enlarged fragmentary sectional view taken along line 3–3 of FIG. 1;

FIG. 4 is a schematic illustration of the position of the centers of the bearing surfaces;

FIG. 5 is a sectional view similar to FIG. 3 illustrating a second form of the invention;

FIG. 6 is a sectional view similar to FIG. 3 illustrating a third form of the invention;

FIG. 7 is a fragmentary plan view of the retainer fastening means; and

FIG. 8 is a fragmentary view of one of the retainer portions and bearing surfaces in the no-load condition.

DESCRIPTION OF THE PREFERRED EMBODIMENTS

Referring to the drawings and in particular to Figs. 1—3 thereof, reference numeral 11 designates one form of coupling constructed in accordance with the teachings of this invention. In the embodiment illustrated the coupling 11 is used to flexibly interconnect hollow duct sections 13 and 15 which form a part of a fluid carrying system. The duct sections 13 and 15 are particularly adapted for installation in an aircraft and for carrying air under pressure to pressurize the cabin thereof.

A shown in FIG. 3 the end portions of the duct sections 13 and 15 actually form a part of the coupling 11. The coupling 11 is symmetrical about a radially extending line 17, and accordingly, only one-half of the coupling is described in detail with corresponding reference character followed by the letter a being utilized to designate corresponding parts. The duct sections 13 and 15 are cylindrical and the end portions thereof are defined by ferrules 19, 19 a, 98 which are preferably constructed of titanium. The ferrule 19 is formed with an integral circumferentially extending flange 21 and a bearing member 23 is mounted on the ferrule 19, in engagement with the flange 21. The bearing member 23 is annular and extends continuously and completely around the ferrule 19. The bearing member 23 has a bearing surface 25 which is spherical and convex.

In order that the bearing member 23 need not be made excessively large, hoop stresses are preset therein. This may be accomplished by shrinking the bearing member 23 over the ferrule 19. This not only provides hoop stresses in the bearing member 23 but also tightly secures the bearing member to the ferrule The duct sections 13 and 15 are held against axial separation by a retainer 27. As best seen in FIG. 1, the retainer 27 is provided in two half sections 29 and 31 which are held together by a pair of bands 33. Each of the bands 33 defines a pair of loops 35 and 37 at the opposite ends thereof. The loops 35 are suitably pivotally interconnected as by a pair of pins 39 projecting through the loops and a pair of links 41 (only one being shown in FIG. 1) which interconnect the outer ends of the pins 39. The loops 37 at the opposite ends of the bands 33 are releasably interconnected by identical fasteners 43 and 43a, the details of which are described more particularly hereinbelow.

Each of the half sections 29 and 31 are identical and each of them generally includes a pair of retainer portions 45 and 45a (FIG. 3) interconnected by a sleeve section 47. Peripheral flanges 49 extend circumferentially around each of he half sections of the retainer 27 and define a pair of channels in which the bands 33 are seated. The bands 33 lie closely adjacent the edges of the retainer 27 as shown in FIGS. 2 and 3.

the retainer portions 45 and 45a are identical and include, respectively, a retainer surface or outer bearing surface 51, 51a of concave spherical configuration to mate with the bearing surfaces 23 and 23a. Although the bearing and retaining surfaces are stated herein to be "spherical", it is apparent from FIGS. 3 and 5 that these surfaces define bearing portions of spheres rather than full spheres. Preferably each of the retainer surfaces 51, 51a extends continuously for the full length of their respective half sections 29 and 31. Because of the slope of the bearing surfaces and retaining surfaces, the retainer 27 prevents axial separation of the duct sections 13 and 15.

When the duct sections 13 and 15 are pressurized, the air pressure therewithin acting on end surfaces thereof tends to axially separate the duct section. Because of the shape and slope of the bearing and retaining surfaces, a reaction component of the force of pressurization is exerted radially inwardly on the bearing members 23 and 23a. However, as these bearing members have preset hoop stresses therein, these radial inward forces tend to offset or neutralize the preset hoop stresses. Thus, the amount to which the bearing members 23 and 23a are stressed during operation of the system, is substantially reduced. For this reason, the bearing members 23 and 23a may be relatively small, lightweight members. Although this construction requires that the ferrules 19 and 19a withstand additional compressive force, this has not proved problematical or required a beefing up of the ferrules.

Fig. 4 diagrammatically illustrates the duct sections 13 and 15 in their normal operational position in which the duct sections are axially separated to the extent permitted by the retainer 27. In this position, a radially extending plane 53 bisects the coupling and intersects the centerline 55 of the duct sections 13 and 15 at a point 57 which defines the center of the coupling.

With the present invention, however, the points 59 and 59a define the centers of the bearing surfaces 25 and 25a, respectively. In the embodiment illustrated, the centers of the retainer surfaces 51 and 51a are also located at the points 59 and 59a, respectively. From FIG. 4, it can be seen that the points 59 and 59a are axially spaced and lie on opposite sides of the point 57. Thus, radial lines drawn from the points 59 and 59a to corresponding locations on their respective bearing surfaces intersect at a point 61. Preferably, the points 59 and 59a are located on the centerline 55 and are spaced equal distances from the point 57 in which event the point 61 lies within the plane 53. Although the center line 55 should be the same for both of the cylindrical duct sections 13 and 15, during assembly some radial misalignment of the centerlines of the two-duct sections will occur in which event the points 59 and 59a preferably lie on the centerline of the duct sections 13 and 15, respectively. The surfaces 23 and 23a are spherical and therefore form a ball joint with the retainer 27. The ball joint mounts the duct sections 13 and 15 for universal pivotal movement about the centers 59 and 59a, respectively, when the duct sections are pressurized and held tightly against the retainer surfaces 51 and 51a.

One advantage of so locating the centers of the bearing surfaces 25 and 25a is that the bearing members 23 and 23a can be moved closer together to thereby axially shorten the coupling 11 and reduce the weight thereof. It will be appreciated that if the bearing members 23 and 23a were allowed to remain close together and the centers therefor were at the point 57, that the slope of the bearing surfaces 25 and 25a would be insufficient and that wedging between the bearing and retainer surfaces would be likely to occur. For this reason, a limit is reached beyond which the bearing members 23 and 23a cannot be moved closer together if the centers thereof are to remain at the point 57. On the other hand, if the spacing between the centers 59 and 59a is too great, the coupling will be thickened too great an amount by virtue of the relatively steep slope which the bearing surfaces 25 and 25a would have.

As mentioned above, the centerlines of the duct sections 13 and 15 will be at least slightly radially misaligned during assembly of the duct section. On the other hand, the couplings must be designed to accommodate a predetermined amount of pivotal movement between the duct sections. With prior art units, the radial misalignment of the centerlines of adjacent duct sections reduces the amount of pivotal movement that the coupling would allow between the two-duct sections. Axial spacing of the centers of the two bearing surfaces 25 and 25a as shown in FIG. 4 overcomes this problem. Furthermore, the amount of radial misalignment which a coupling 11 can accommodate without having it reduce the amount of pivotal movement of the duct sections is proportional to the distance $d$ between the centers 59 and 59a. Specifically, the amount of radial misalignment which can be withstood is a function of $d$ and the angle $\alpha$ where $\alpha$ is the amount of pivotal movement that the coupling is designed to permit on each side thereof. Thus, if the total pivotal movement required is 4°, $\alpha$ would equal 2°.

It is apparent therefore that the precise spacing between the centers 59 and 59a must be selected to suit particular design requirements. Selection of the axial spacing between the centers 59 and 59a must be done with a view toward the anticipated amount of radial misalignment that will occur during assembly, the amount by which it is desired to axially shorten the coupling, and the maximum desired radial width of the bearing members.

As shown in FIG. 3, the ferrule 19 has spaced parallel annular flanges 63 at the inner end thereof which defines a groove 65 for retaining a resilient annular seal 67. The innermost flange 63 has an aperture 69 therein for admitting air under pressure from within the duct sections to the inner end of the groove 65.

A cylindrical floating sealing sleeve 71 sealingly engages the outer peripheries of the seals 67 and 67a and spans the gap therebetween to form an airtight joint therewith. The sleeve 71 extends axially beyond the seals 67 and 67a and is spaced radially inwardly from the web 47 of the retainer 27. The sleeve 71 may be constructed of a relatively thin-gauge metal and is not a Structural member. Accordingly, the sleeve 71 moves with the seals 67 and 67a.

As the fasteners 43 and 43a are identical, only the fastener 43 is described herein in detail. The fastener 43 includes a barrel or receptacle 72 having a cylindrical, radially extending recess 73 therein. The barrel 72 is mounted within one of the loops 37 by any suitable means such as a rivet 74 which terminates at the bottom of the recess 73. As shown in FIG. 1, the recess 73 opens away from the other of the loops 37. The barrel 72 is preferably cylindrical and the recess projects radially over halfway through the barrel. In the embodiment illustrated the bottom of the recess 73 is defined by the head of the rivet 74 which forms an abutment 75. The abutment is located intermediate the centerline of the barrel and the other of the loops 37. Thus, as shown in FIG. 2, a line 76 drawn straight out from the abutment 75 lies intermediate the loops 37 and the centerline 77 of the barrel 72. This permits the fastener 43 to operate with a toggle-type action.

A pin 78 extends through the adjacent loop 37 and a U-shaped member 79 is attached to the pin. The U-shaped member 79 has two arms 81 in the form of wide strips of a rigid material joined by a bend portion 82. A nut 83 is suitably mounted on the U-member 79 adjacent the bend portion thereof. A bolt 84 having a head 85 and a threaded shank 86 is provided with the threaded shank portion being received in the nut 83 and projecting into the recess 73 of the barrel 72. The threaded shank 86 also projects through an opening 87 in the loop 37.

The fastener 43 in the positions shown in FIG. 2 and in full lines in Fig. 1 is in the locked position. In this position, the bolt 84 projects through the nut 83 and the opening 87 in the loop 37, and into the recess 73 into engagement with the abutment 75. By turning the bolt 84, the bands 33 can be tightened circumferentially. Such tightening of the band will place the portion of the shank 86 betweem the nut 83 and the abutment 75 in compression. To release the fastener, the bolt 84 is turned to remove the shank 86 from the recess 73. The U-shaped member 79 with the nut 83 and bolt 85 affixed thereto can then be pivoted upwardly to a second position as shown in phantom in FIG. 1 to thereby allow removal of the half sections 30 and 31.

As the arms 81 are attached to the band 33 along the outer edges thereof, a more rigid connection therebetween is formed. The arms 81 are sufficiently wide to fairly snugly embrace the loop 37 and the barrel 72 therein to help maintain alignment between the two adjacent loops 37.

In operation of the coupling 11, the duct sections 13—15 are pressurized and the force of the fluid pressure therein tends to axially separate the duct sections. The surface 71 engages the seals 67 and 67a to tightly seal the coupling against air leakage therefrom. During flight of the aircraft containing the duct sections 13—15, forces are applied to the duct sections which cause them to pivot relative to each other. The mating bearing surfaces and retainer surfaces allow the pivotal action to occur through a relative sliding movement between the bearing surfaces and the retainer surfaces. Such pivotal movement occurs about pivotal axes extending through the points 59 and 59a. When one of the duct sections pivots, the seal mounted thereon moves with the duct section. The floating sealing sleeve 71, however, moves freely with the moving seal to continue to maintain a fluid-tight sealing relationship therewith.

Fig. 5 illustrates a coupling 101 of modified construction which is particularly adapted for use with smaller diameter duct sections or duct sections which undergo a limited amount of angular movement in that it has no floating sealing sleeve. The coupling 101 is symmetrical about a transversely extending line 103 and accordingly, only the right half thereof is illustrated in section. The coupling 101 is used to interconnect duct sections 105 and 107. THe duct section 105 has a bearing member 109 shrunk thereon to preset hoop stresses therein in the manner described hereinabove. The bearing member 109 has a spherical convex bearing surface 111, the center of which is positioned as described in connection with Fig. 4. The bearing member 109 is retained on the duct section 105 between annular flanges 113 and 115. If desired, the end portion of the duct sections 105 and 107 may be in the form of titanium ferrules as in the embodiment of Figs. 1—4.

The coupling 101 includes a retainer 117 which has a sleeve section 119 and a retainer member 121 for each of the bearing members. The retainer member 121 is in the form of a split ring and is mounted on the sleeve section 119 by a groove 123 in the sleeve section and a tongue 125 on the retainer member. The retainer member 121 has a concave spherical retainer surface 127 the center of which is located as described hereinabove in connection with FIG. 4.

The sleeve section 119 is generally cylindrical and is not provided in multiple sections. By expanding the split ring retainer member 121, the retainer member can be installed on the end portion of the duct section 105. The sleeve section 119 is then telescoped over the end portion of the duct section 105 and with the retainer member 121 axially spaced from the bearing member 109, the tongue 125 can be inserted into the groove 123. Thus, this construction facilitates assembly and is somewhat lighter and simpler than the construction shown in Figs. 1—3.

The flange 113 and a second circumferentially extending flange 127 define a groove 129 for receiving and retaining an annular O-ring seal 131. The flange 127 has an aperture 133 therein to permit fluid pressure loading of the seal 131. As the coupling 101 is of relatively small diameter, the floating sealing sleeve 71 has been ommited therefrom. Thus, the seal 131 contacts the bottom of the groove 129 and the inner surface of the sleeve section 119 to form a fluid-tight seal therewith. Except for the absence of a floating sealing sleeve, the operation of the coupling 101 is the same as that described above.

Figs. 6—8 show a coupling 201 which represents a third form of the invention. The coupling is used to join cylindrical duct sections 203 and 205 each of which have end portions in the form of titanium ferrules 207 and 207a, respectively. Except for retainer fastening means 209, the coupling 201 is symmetrical about a radial line 211, and accordingly, corresponding parts are designated by corresponding reference characters followed by the letter a.

The ferrule 207 has an integral annular projection 213 which forms a base for a bearing member 215 which is preferably constructed of steel. The bearing member 215 has a spherical bearing surface 217, the center of which is positioned as described hereinabove in connection with Fig. 4. The bearing 215 has an axial cylindrical extension 219 and is suitably mounted on the base 213. The bearing member 215 is preferably shrunk on the base 213 and has preset hoop stresses therein.

The duct sections 203 and 205 are held together by retainer 221 which includes a pair of half sections 223 (only one being shown), a retainer sleeve 225 and the retainer fastening means 209. The half sections 223 have radially inwardly projecting retainer portions 227 and 227a which engage the bearing surfaces 217 and 217a to hold the duct sections 203 and 205 against axial separation. The retainer sleeve 225 slips over the half sections 223 and hold them tightly together.

The retainer fastening means 209 includes a plate member 229 welded to the retainer sleeve 225 and having a portion thereof cut away to define a slot 231 FIGS. 6 and 7). The other end portion of the plate member 229 is turned upwardly to form a handle 233.

A spring member 235 is suitably secured to the plate member 229 as by welding and extends over and through a portion of the slot 231. The spring member 235 is self urged downwardly so that it only tends to assume a portion beneath the one illustrated in FIG. 6. The end portion of the spring member 235 is turned downwardly to form an abutment 237 and then outwardly to form a lifting end 239. As shown in FIG. 6, the abutment 237 engages the edge of the half section 223 to prevent the retainer sleeve 225 from sliding off of the half sections. A second one of the retainer fastening means 209 is provided, but not illustrated, on the opposite side of the retainer sleeve 225 to prevent the retainer sleeve form sliding off of the half sections 223 in the other direction.

When it is desired to remove the retainer sleeve 225, it is only necessary to lift the spring member 235 sufficiently to allow the abutment 237 and the lifting end 239 to clear the edge of the half section 223 therebelow. this permits the sleeve 225 to be slid off of the half sections 223.

The retainer portion 227 is relatively resilient and may be constructed of a suitable metal. As shown in FIGS. 6 and 8, the retainer portion 37 has a base portion 241 and a web portion 243. The retainer portion 227 has a retainer surface 245 which is defined by the portions 241 and 243. In the unloaded or unstressed condition of the retainer portion 227 illustrated in FIG. 8, the portion of the retainer surface 245, that is defined by the web portion 243, contacts the bearing surface 217 while the portion of the surface 245 defined by the base portion 241 is spaced slightly from, or only very lightly contacts the surface 217. The spacing between the portion of the surface 245 defined by the base portion 241 and the surface 217 is exaggerated in FIG. 8 for clarity.

When the duct system is pressurized so that the surfaces 245 and 217 forcibly engage, the web portion 245 yields or deforms sufficiently to permit contact between the surfaces 217 and the base portion 241, as shown in FIG. 6. Thereafter either or both of the portions 241 and 243 deform as necessary to obtain a wide area of contact between the surfaces 217 and 245. With this construction, a wider area of contact between the surfaces 217 and 245 is assured and the useful life of the coupling is extended.

The retainer portion 227 in the embodiment illustrated is made slightly resilient by cutting out a region of the retainer portion 227 immediately above the web portion 243. This gives an added advantage of reducing the weight of the coupling. The surface 245 is substantially spherical in the unstressed condition shown in FIG. 8 and is made even more spherical when the system is loaded and the surface 245 is forced to assume the contour of the bearing surface 217. The center of the spherical surface 245 is located as described with FIG. 4 hereinabove.

Flanges 247 on the ferrule 207 defines a groove 249 for receiving and mounting a resilient O-ring seal 251. The innermost flange 247 has an aperture 253 therein to permit pressure loading of the seal 251 and a floating sealing sleeve 255 engages the outer peripheries of the seals 251 and 251a and spans the gap therebetween to form a fluid-tight seal therewith. This construction is identical to that illustrated and described in connection with FIGS. 1—3.

The bearing extension 219 is preferably cylindrical and adapted to engage the inner surface of the floating sealing sleeve 255 when a predetermined amount of angular deflection of the duct sections 203 and 205 occurs. Because of the positions and shapes of the extension 219 and the sleeve 225, the sleeve will not be able to contact the edge of the bearing member 215, and therefore harmful contact therebetween is eliminated.

Although exemplary embodiments of the invention have been shown and described many changes, modifications, and substitutions may be made by one having ordinary skill in the art without necessarily departing from the spirit and scope of this invention.

I claim:

1. A flexible coupling for connecting first and second ducts wherein the ducts are subject to moving relative to each other, said flexible coupling comprising:
   first and second ferrules connectable, respectively, to the first and second ducts, said ferrules having confronting ends;
   first and second means on said first and second ferrules, respectively, defining first and second seal grooves, said first and second seal grooves being adjacent said ends of said first and second ferrules, respectively;
   first and second sealing rings in said first and second seal grooves, respectively;
   a floating sealing sleeve surrounding said sealing rings in sealing engagement therewith and spanning the gap between said sealing rings to provide a substantially fluid-tight seal;
   bearing means providing first and second bearing surfaces on said first and second ferrules, respectively, said first and second bearing surfaces being on opposite sides of the center of the coupling and having first and second generally spherical regions, respectively, the centers of said spherical regions of said first and second bearing surface lying generally on the axes of the first and second ferrules, respectively, and being axially spaced, the centers of each of said first and second spherical regions lying on the side of the center of the coupling opposite its respective spherical region;
   retainer means having first and second retaining surfaces slidably engageable respectively, with the first and second spherical regions to interconnect the first and second ferrules for relative universal movement about first and second pivotal axes, respectively, said first and second pivotal axes extending generally through the centers of the first and second surface regions, respectively; and said bearing means and said retainer means at least partially defining a housing surrounding portions of the ferrules adjacent to the ends thereof, said floating sealing sleeve and said seals being positioned within the housing with sufficient clearance being provided around the floating sealing sleeve to accommodate transverse movement of the floating sealing sleeve relative to the housing, said first and second retainer surfaces sloping toward the first and second ferrules as they extend axially outwardly from the center of the coupling.

2. A combination as defined in claim 1 wherein said retainer means includes a pair of circumferentially extending half sections pivotally interconnected at one end and threaded means for releasably interconnecting the opposite ends of said half sections.

3. A flexible duct coupling for connecting first and second duct sections together wherein the duct sections tend to separate axially the duct sections have generally confronting ends and are subject to angular movement relative to each other about an axis extending generally transverse to the duct sections comprising:
   first and second seals;
   first wall means defining a seal channel for mounting the first seal in sealing relationship with the first duct section adjacent the end thereof, said seal channel extending radially for a major portion of the radial dimension of the first seal;
   second means for mounting the second seal in sealing relationship with the second duct section adjacent the end thereof;
   a sealing sleeve extending between the first and second seals and being engageable with the seals in substantially fluid-tight sealing relationship;
   means defining a first bearing on the first duct section, said first bearing having a first bearing surface.
   means defining a second bearing on the second duct section, said second bearing having a second bearing surface, said first and second seals lying intermediate said bearings;
   retainer means having first and second retainer portions interconnected by a connecter portion, said first and second retainer portions having first and second retaining surfaces engageable, respectively, with said first and second bearing surfaces for retaining the duct sections against axial separation, at least a substantial segment of said connecter portion lying radially outwardly of said sealing sleeve;
   said first wall means being means other than said retainer means;
   said first retaining surface and said first bearing surface extending circumferentially of the first duct section, said first retaining surface and said first bearing surface being configured to permit relative sliding movement therebetween in a noncircumferential direction to accommodate said angular movement; and
   the retainer means and said sleeve being arranged to allow the sleeve to be moved relative to the retainer means in a generally transverse direction in response to certain relative movement between the duct sections.

4. A combination as defined in claim 3 wherein said seal channel terminates in wall portions adjacent said sleeve means said wall portions being relatively thin.

5. A combination as defined in claim 3 wherein said wall means has an aperture therein providing communication between the seal mounted by said first wall means and the interior of at least one of the duct sections to thereby permit pressure loading of said last mentioned seal with the fluid carried by said one duct section.

6. A combination as defined in claim 3 wherein said sealing sleeve is a relatively thin member which is somewhat deflectible.

7. A combination as defined in claim 3 wherein said first bearing surface has a generally spherical portion which is engageable with the first retaining surface during said angular movement.

8. A combination as defined in claim 3 wherein the coupling has a center and said first bearing surface lies on one side of a radially extending plane containing said center, said first bearing surface being arcuate in axial cross section and having a center the center of said bearing surface of said first duct section lying on the other side of said plane.

9. A combination as defined in claim 3 wherein said first bearing is generally of ringlike configuration and is shrunk on said first duct section to thereby preset hoop stresses in said first bearing means.

10. A combination as defined in claim 3 wherein said means defining the fist bearing includes a bearing extension circumscribing the first duct section radially inwardly of the floating sealing sleeve.

11. A flexible duct coupling for joining first and second duct sections having generally confronting ends wherein the duct sections are subject to relative movement about an axis extending generally transverse to the duct sections and the duct sections are pressurizable to tend to axially separate the duct sections comprising:
first and second seals;
first means defining a seal channel for mounting the first seal in sealing relationship with one of the duct sections adjacent the end thereof, said seal channel extending radially for a major portion of the radial dimension of the first seal;
second means for mounting the second seal in sealing relationship with the other of the duct sections adjacent the end thereof, said first and second seals substantially circumscribing their respective duct sections;
sleeve means for surrounding the seals in substantially fluid-tight sealing engagement therewith and spanning the gap therebetween to thereby sealingly enclose the regions between the confronting ends of the duct sections;
means on the first duct section defining a first bearing surface extending circumferentially of the first duct section;
a member on the second duct section and extending circumferentially thereof;
interconnecting means other than said sleeve means for interconnecting said first and second duct sections for pivotal movement of said first duct section relative to the second duct section to thereby permit said relative angular movement to occur;
said interconnecting means including first and second retainer portions joined by a connecter portion, at least a substantial segment of said connecter portion lying radially outwardly of said sleeve means, said first and second retainer portions being engageable with said bearing and said member, respectively, to retain the duct sections against axial separation;
said first retainer portion extending circumferentially of said first bearing surface and being in engagement therewith at a plurality of regions arranged circumferentially around said first bearing surface, said last-mentioned engagement being maintained throughout said relative angular movement whereby the load on said first retainer portion and said first bearing surface as a result of duct pressurization is distributed around said first bearing surface during said relative angular movement; and
said connecter portion and said sleeve means being arranged to permit the sleeve means to move generally transversely toward and away from the connecter portion whereby said coupling can accommodate substantial relative angular movement between said duct sections.

12. A flexible duct coupling as defined in claim 11 wherein said first means is means other than said retainer portions.

13. A flexible duct coupling as defined in claim 11 wherein said means defining a first bearing surface includes a separate bearing member mounted on and substantially circumscribing the first duct section.

14. A combination as defined in claim 11 wherein said engagement between said first retainer portion and said first bearing surface is substantially continuous and maintained for substantially 360°.

15. A flexible duct coupling for connecting first and second duct sections together wherein the duct sections are pressurized to tend to axially separate the duct sections, the duct sections have generally confronting ends and are subject to angular movement relative to each other about a generally transverse pivotal axis, said duct coupling comprising:
first and second seals, each of said seals having an outer periphery;
first wall means on the first duct sections projecting generally radially outwardly therefrom for mounting the first seal on the first duct section adjacent the end thereof;
second wall means on the second duct section and projecting generally radially outwardly therefrom for mounting the second seal on the second duct section adjacent the end thereof, said first and second wall means substantially laterally confining the first and second seals, respectively, said first and second seals being movable by said first and second duct sections, respectively;
a sealing sleeve engageable with the outer peripheries of the seals and spanning and circumscribing the gap therebetween, said sealing sleeve being movable by said seals;
first circumferentially extending bearing means on the first duct section for defining a first bearing surface;
second circumferentially extending bearing means on the second duct section for defining a second bearing surface, said first and second seals lying axially intermediate said bearing surfaces;
a retainer having first and second retainer portions interconnected by a connecter portion, said connecter portion lying radially outwardly of the sealing sleeve, said first and second retainer portions having first and second circumferentially extending retaining surfaces engageable, respectively, with said first and second bearing surfaces for retaining the duct sections against axial separation;
said first retaining surface and said first bearing surface being configured to permit relative sliding movement therebetween in a noncircumferential direction when the duct sections are pressurized to thereby accommodate said angular movement;
said first wall means being means other than said retainer; and
said first and second wall means and said retainer being spaced from said sealing sleeve to provide space around said sealing sleeve to thereby permit said seals to move the sealing sleeve generally transversely with respect to the retainer during said angular movement.

16. A combination as defined in claim 15 wherein said first bearing surface has a spherical region whereby the first bearing surface and the first retaining surface mount the first duct section for pivotal movement about a pivotal axis extending generally radially of the first duct section, said first retaining surface extends toward the first duct section at an acute angle as the first retaining surface extends away from the second retaining surface, said first retaining surface and said first bearing surface being in sliding contact as the first duct section pivots about said pivotal axis, said retainer at least substantially surrounds the sealing sleeve.

17. A flexible coupling for joining first and second duct sections having generally confronting ends wherein the duct sections tend to separate and are subject to moving angularly relative to each other comprising:
means defining a first bearing on the first duct section adjacent the end thereof, said first bearing defining a first bearing surface;
a member on the second duct section adjacent the end thereof;
first and second seals;

means for mounting said first and second seals on the first and second duct sections, respectively, adjacent said first bearing and said member;

sleeve means sealingly engaging said seals and spanning and circumscribing the gap therebetween to provide a substantially fluid-tight seal;

retainer means having first and second retainer portions interconnected by a connector portion, said first and second retainer portions having first and second retainer surfaces, respectively;

said retainer means being means other than said sleeve means;

said first and second retainer surfaces being engageable with said first bearing surface and said member, respectively, to retain the duct sections against separation, said first bearing surface and said first retainer surface extending generally circumferentially of the first duct section;

at least one of said first bearing surface and said first retainer surface having an arcuate surface region which is arcuate in axial cross section, said arcuate surface region having a center, said center and said arcuate surface region lying on opposite sides of a radial plane containing the center of the coupling; and said retainer means being spaced from said sleeve means to allow relative transverse movement therebetween in response to certain relative movement between the duct sections.

18. A coupling as defined in claim 17 wherein said seals are axially intermediate said first bearing and said member.

19. A flexible duct coupling as defined in claim 17 wherein said one surface is said bearing surface.

20. A flexible duct coupling as defined in claim 17 wherein said member has a second bearing surface, at least one of said second bearing surface and said second retainer surface having an arcuate surface region which is arcuate in axial cross section, said last-mentioned arcuate surface region having a center, said last-mentioned center and said last-mentioned arcuate surface region lying on opposite sides of said radial plane.

21. A flexible duct coupling as defined in claim 20 wherein said one surface is said first bearing surface and said second surface is said second bearing surface.

22. A flexible duct coupling as defined in claim 17 wherein said one surface is said first bearing surface and said first retainer surface has an arcuate surface region which is arcuate in axial cross section and which slidably engages the arcuate surface region of said first bearing surface, said arcuate surface region of said first retaining surface having a center, said last-mentioned center generally coinciding with the center of the arcuate surface region of said first bearing surface.